United States Patent
Das Gupta et al.

(10) Patent No.: US 9,665,391 B2
(45) Date of Patent: May 30, 2017

(54) AUTOMATED TRANSACTION TUNING IN APPLICATION SERVERS

(75) Inventors: Rudranil Das Gupta, Kolkata (IN); Kaushik Lahiri, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 13/473,782

(22) Filed: May 17, 2012

(65) Prior Publication Data

US 2013/0311622 A1 Nov. 21, 2013

(51) Int. Cl.
*G06F 15/177* (2006.01)
*G06F 9/46* (2006.01)
*H04L 29/08* (2006.01)

(52) U.S. Cl.
CPC ............ *G06F 9/466* (2013.01); *H04L 67/325* (2013.01)

(58) Field of Classification Search
CPC ........ H04L 1/188; H04L 67/325; G06F 9/466
See application file for complete search history.

(56) References Cited

U.S. PATENT DOCUMENTS

| | | | |
|---|---|---|---|
| 5,329,619 A * | 7/1994 | Page et al. | 709/203 |
| 7,213,049 B2 | 5/2007 | Felt et al. | |
| 7,308,617 B2 | 12/2007 | Artobello et al. | |
| 7,702,957 B2 | 4/2010 | Shinn et al. | |
| 7,747,755 B2 | 6/2010 | Manolov | |
| 2005/0268136 A1* | 12/2005 | Kostadinov et al. | 713/400 |
| 2007/0118843 A1* | 5/2007 | Seelig et al. | 719/330 |
| 2007/0288481 A1 | 12/2007 | Shinn et al. | |
| 2009/0328050 A1* | 12/2009 | Liu | G06F 9/5088 718/104 |
| 2011/0055376 A1* | 3/2011 | Little | 709/224 |
| 2011/0078304 A1* | 3/2011 | Lee et al. | 709/224 |
| 2011/0106940 A1* | 5/2011 | Chauvin | G06F 11/0757 709/224 |

OTHER PUBLICATIONS

Parallel, Distributed and Network-Based Processing, 2005, PDP 2005. 13th Euromicro Conference Entitled WAS Control Center: An Autonomic Performance-Triggered Tracing . . . .
Autonomic Computing Toolkit Developer's Guide, Entitled Developer's Guide, Document No. SC30-4083-02.
IBM Systems Magazine, Entitled "Self-Managing Systems" http://www.ibmsystemsmag.com/aix/trends/whatsnew/Self-Managing-Systems.
EJB 3.0 Timer Services and Timer Serv. API in EJB 3.0, Entitled "EJB 3.0 Timer Services—An Overview" http://www.javabeat.net/articles/3-ejb-30-timer-services-an-overview-1.
Configuring the Runtime Trans. Serv . . . http://publib.boulder.ibm.com/infocenter/wasinfo/v7r0/index.jsp?topic=/com.ibm.websphere.express.doc/info/exp/ae/txml_transaction.html.

* cited by examiner

*Primary Examiner* — Philip Chea
*Assistant Examiner* — Robert B McAdams
(74) *Attorney, Agent, or Firm* — David B. Woycechowsky (57) ABSTRACT

The transaction timeout values for applications deployed in an enterprise application server are dynamically adjusted for each application request made by each of multiple applications. Transaction timeout values are dynamically determined based upon known load and status of database and enterprise network connection conditions and historical data related to the application database requests. Time increments are appended to timeout values as needed and when a transaction timeout event occurs.

12 Claims, 6 Drawing Sheets

AUTOMATED TRANSACTION TUNING IN APPLICATION SERVERS

BACKGROUND OF THE INVENTION

1. Field of the Invention

Embodiments of the present invention relate to transaction timing in Application Servers and, more particularly, to dynamically adjusting transaction timeout values in Application Servers.

2. Background and Related Art

A typical transaction service involves a server runtime component that coordinates updates to multiple resource managers to ensure atomic updates of data. Transactions are generally started and ended by applications, and transaction times may be predetermined or may be a default timeout. Manual modification of the timeout by an individual administrator may be carried out depending upon the topology of the environment. System resources are wasted where timeouts do not approximate the actual time needed for transactions.

SUMMARY OF THE INVENTION

In accordance with an embodiment of the invention, a method for automatically tuning transaction timeout values in an application server comprising; determining an initial transaction timeout value for return of an enterprise application request based upon known load and status of database and network connection conditions used to respond to the enterprise application request; adjusting said transaction timeout value based upon current load and status of database and network connection conditions used to respond to the enterprise application request; and readjusting said transaction timeout when a transaction timeout event occurs.

An embodiment in accordance with the above method for automatically tuning timeout values wherein the timeout value is dynamically, readjusted incrementally as said load and status of database network connection conditions change.

In accordance with an embodiment of the invention, a system for automatically tuning transaction timeout values in an application server comprising, a continuous timeout computation module for continuously computing transaction timeout values for each enterprise transaction request of each application on said enterprise server; a transaction timeout origin determining module for determining the cause of a transaction timeout; a database query analyzer arranged to analyze application transaction query requests of an enterprise database to determine which database and tables are invoked, the number of queries executed thereon and database log size to create historical data patterns to correlate with timeout events and formulate appropriate timeout values; a timeout setter module coupled to said database query analyzer to set transaction timeout values for application transaction requests of individual applications based upon said timeout values; and an intelligent progressive increment module coupled to said continuous timeout computation module to determine timeout events and time increments to be added to said transaction timeout values in response to said timeout events.

In accordance with an embodiment of the invention, a computer program product for automatically tuning timeout values in an application server comprising; a computer readable storage medium; a first program instruction for determining an initial transaction timeout value for return of an enterprise application request based upon known load and status of database and network connection conditions used to respond to the enterprise application request; a second program instruction for adjusting said transaction timeout value based upon current load and status of database and network connection conditions used to respond to the enterprise application request; a third program instruction for readjusting said transaction timeout value when a timeout event occurs; and wherein said first and second program instructions are stored on said computer readable storage medium.

BRIEF DESCRIPTION OF THE DRAWINGS

The present invention is illustrated by way of example, and not by way of limitation, in the figures of the accompanying drawings and in which.

DETAILED DESCRIPTION OF THE DRAWINGS

As will be appreciated by one skilled in the art, aspects of the present invention may be embodied in any of a variety of ways, some of which will be described herein.

In this regard, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Portions of the program code may execute on the user's computer or terminal, and portions on intermediate and/or remote computers or servers. The remote computers may be connected to the intermediate and/or user's computer or terminal through any type of network, including a local area network (LAN) or a wide area network (WAN), or the connection may be made to an external computer (for example, through the Internet using an Internet Service Provider).

Aspects of the present invention are described below with reference to system and flowchart illustrations and/or block diagrams of methods, apparatus (systems) and computer program products according to embodiments of the invention. It will be understood that each block of the flowchart illustration, and combinations of blocks in the flowchart illustrations, can be implemented by computer program instructions. These computer program instructions may be provided to a processor of a general purpose computer, special purpose computer, or other programmable data processing apparatus to produce a machine or system, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or system, other programmable data processing apparatus, or other devices, such as, storage devices, user terminals, or remote computers such as, servers, to function in a particular manner, such that the instructions stored in the computer readable medium produce an article of manufacture including instructions which implement the function/act specified in the flowchart and/or block diagram block or blocks.

The computer program instructions may also be loaded onto a computer or system, other programmable data processing apparatus, or other devices, such as, storage devices, user terminals, or remote computers such as servers, to cause a series of operational steps to be performed on the computer, computer system arrangement and/or other programmable apparatus or other devices to produce a computer implemented process such that the instructions which execute on the computer, computer system arrangement and/or other programmable apparatus provide processes for implementing the functions/acts specified in the flowchart and/or block diagram block or blocks.

Described herein is a method and apparatus for dynamically and automatically adjusting transaction timing in web applications deployed, for example, in WebSphere Application Server (WAS) enterprise software, such as, the IBM WebSphere software. Application level filtering for WAS transaction timeout values are provided for each application, as opposed to having a single value for all applications running on a particular server. This allows individual transaction timeout values to be dynamically determined for each of multiple applications running on the server using application specific dedicated timeout values for each transaction request of each application with each timeout value determined by the experience and past history of running applications on the server.

The application specific and dedicated transaction timeout values may be changed by analyzing the current behavior of an application transaction to provide real time adjustment of transaction timeout values. The timeout value may be adjusted for each application based upon earlier performance of similar transactions based upon the learning of the script from previous failures where there may have been a timeout due to the fact that the transaction timeout was not near optimal because, for example, of especially "heavy" queries (database queries that are likely to return a large number of rows) were being executed as part of the transactions. Heavy queries are not detected through system utilization, but rather through the learning of the script associated with previous failures. The initial value for a transaction timeout is set as default based upon the initially available knowledge regarding network and database characteristics (e.g. network speed and database schema complexity). The timeout values may be dynamically adjusted based upon current network speed and database execution time for the most frequently executed queries. Whenever a timeout occurs, the script automatically appends a time to the existing transaction timeout value. The script acts to poll the frequency of timeout error which information is used to predict when the next timeout may occur. The next timeout may also be predicted from historical knowledge of the expected level of application usage at a particular time and day. Where there are multiple timeouts, the script acts to send a request to determine if the problem is a network issue or database issue.

Thus, applications hosted on the same WAS having different behavioral patterns are not restricted by a single transaction timeout value, and pursuit of better optimization for improved performance is undertaken within the WAS itself. Adjusting transaction timeout values for this improved performance may be based upon variables, such as, record size, network speed, current database status, current server load, expected server load determined by application usage patterns at that time of the day or on that day of the week and any of a variety of other variable characteristics, such as, the number of concurrent systems accessing the application, in addition to learning of the script from previous failures.

Accordingly, in an embodiment of the invention, a method is provided for automatically tuning transaction timeout values in an application server comprising; determining an initial transaction timeout value for return of an enterprise application request based upon known load and status of database and network connection conditions used to respond to the enterprise application request; and adjusting said transaction timeout value based upon current load and status of database and network connection conditions used to respond to the enterprise application request, as well as the known level of usage of enterprise application at the particular time and day of the week, as determined from previous experience which is captured in the form of rules from historical data stored in internal storage medium. It may also take into consideration concurrency in terms of users, including given application users, through multiple variety of clients, such as, browsers and mobile devices An embodiment in accordance with the above method is provided for automatically tuning timeout values wherein the timeout value is readjusted when a transaction timeout event occurs. The process used for automatic tuning of timeout values depends on the number of successive timeouts that have occurred in a given period of time. For example, for the first few timeouts, a process of incrementing the timeout value may be used, while, if a large number of successive timeout events occur, then further analysis is necessary before determining the timeout value. Incrementation of the timeout for the first few timeouts may be based upon a prefixed value which would be used in arithmetic progression.

In accordance with an embodiment of the invention, a system is also provided for automatically tuning transaction timeout values in an application server comprising, a continuous timeout computation module for continuous computation of transaction timeout values for each enterprise transaction request of each application on said enterprise server; a transaction timeout origin determining module for monitoring each enterprise application transaction requests and timeout events based upon transaction timeout values set by a timeout setter module and determining the origin of the cause of timeout events of for each enterprise transaction request of individual applications; a database query analyzer arranged to analyze each application transaction query request made against an enterprise database to determine the characteristics of long running queries (with the system performing in the same utilization level) which are likely to cause timeout and store this knowledge in internal storage and use this knowledge in the future when intelligently determining or adjusting timeout values is called for; a timeout setter module coupled to said database query analyze to set transaction timeout values for each application transaction request of individual applications based upon said default characteristics; and an intelligent progressive increment module coupled to said continuous timeout computation module to add progressive time increments to said transaction timeout value in response to a timeout event.

In accordance with an embodiment of the invention, a computer program product is further provided for automatically tuning timeout values in an application server comprising; a computer readable storage medium; a first program instruction for determining an initial transaction timeout value for return of an enterprise application request based upon known load and status of database and network connection conditions used to respond to the enterprise application request; a second program instruction for adjusting said transaction timeout value based upon current load and status of database and network connection conditions used to respond to the enterprise application request and also the current time and day which will determine if long-running database queries are likely to be executed; and wherein said first and second program instructions are stored on said computer readable storage medium.

Figure 1:
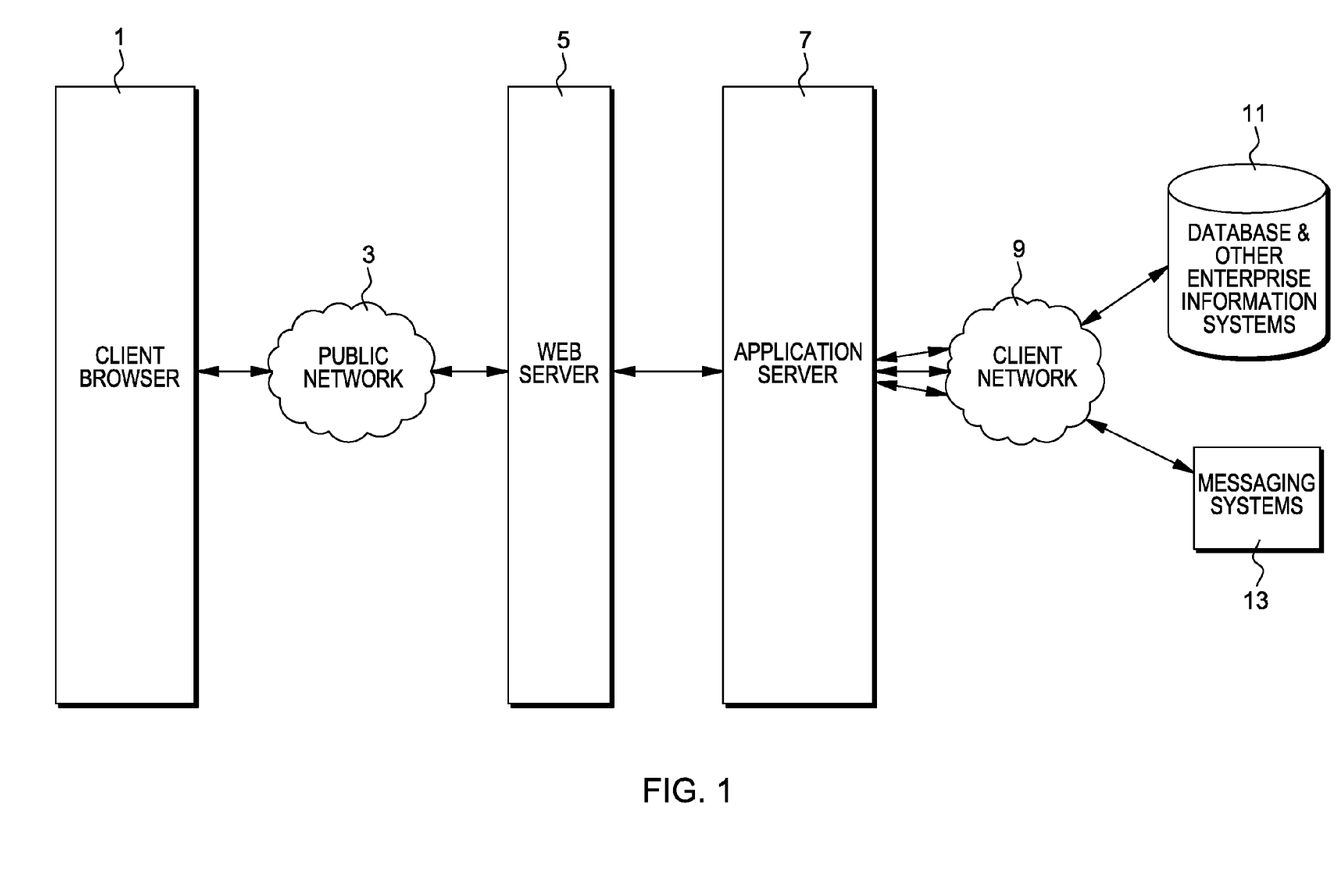
FIG. 1 illustrates an exemplary overall system view in which embodiments of the present invention may operate.

With reference to FIG. 1, there is shown an overall system view in which embodiments of the invention may operate. Client Browser 1 represents front-end web browser applications running on a local computer or server which connects to Web Server 5 through public network 3. The browser applications of Client Browser 1 may be, for example, resident on a personal computer, palm size computing device, personal digital assistant, or any other computing device. Application Server 7 provides the service needed to support the running of enterprise application software programs used in the operation an organization's enterprise background business. Such may be resident on personal computers, rack mount servers or any of a variety of other computing devices operating singly or together to support the organization's enterprise information systems.

Application Server 7 interfaces over Client Network 9 with Database and Other Enterprise Information Systems 11 and Messaging System 13, each of which is embodied in some form of conventional computer system. Client Network 9 is the enterprise network used to connect with Database and other Enterprise Information System, Messaging System 13 and any other systems within the enterprises background business.

Figure 2:
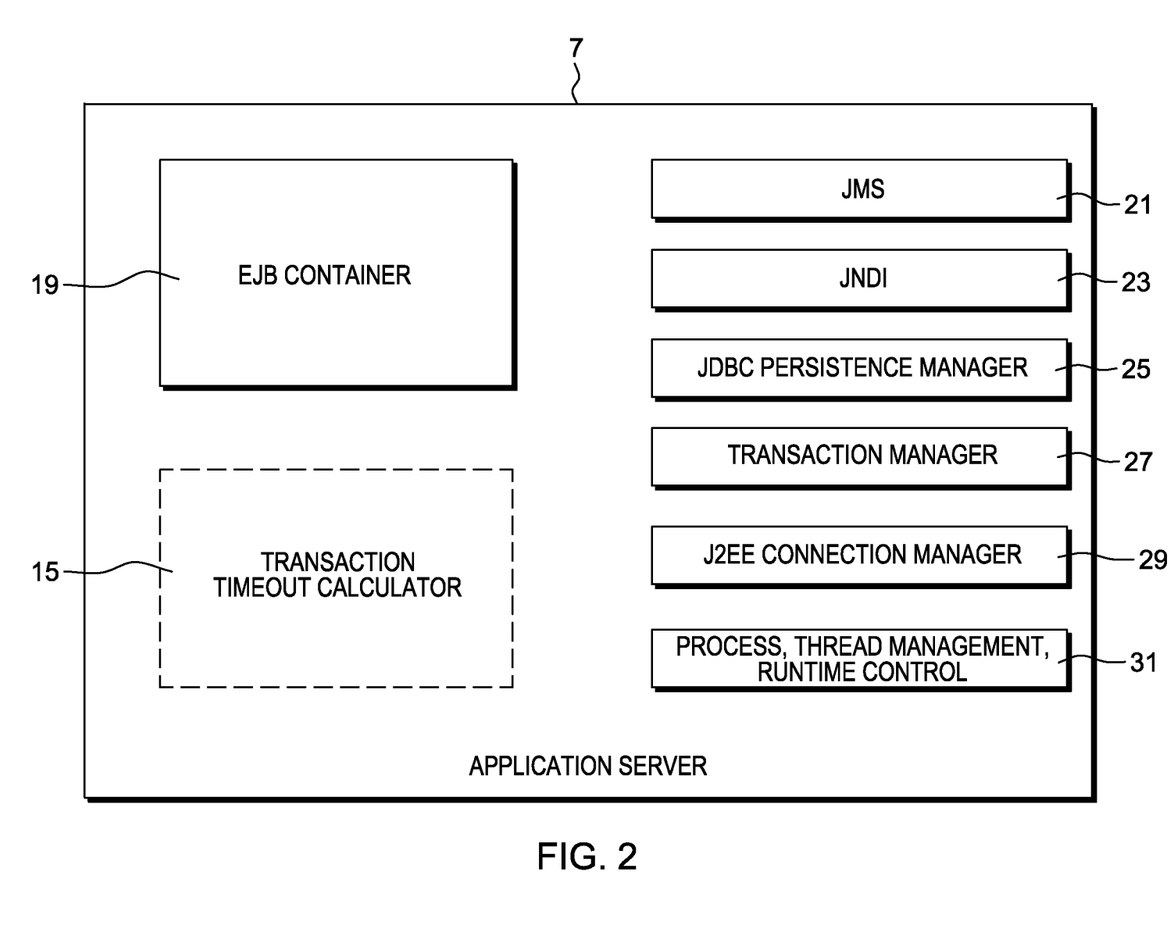
FIG. 2 shows a transaction timeout calculator in accordance with one embodiment of the invention, as may be incorporated into the architecture of an Application Server.

FIG. 2 shows an embodiment of the Transaction Timeout Calculator 15 as a component integrated into the architecture of Application Server 7. In an embodiment using Enterprise Java Beans (EJB) as a component of the architecture of Application Server 7, EJB Container 19 comprises programs which act to provide a run-time environment for enterprise beans within application Server 7 to implement the EJB specification. Transaction Timeout Calculator 15 acts to dynamically and automatically adjust the transaction timeout values for each of multiple applications running on Application Server 7 in an embodiment of the invention, taking into account, for example, the behavioral pattern of each deployed application during particular days or at particular times of the day with respect to the number of queries executed and how "heavy" each query is. The runtime for an application may further be adjusted based upon variables, such as, record size, network speed, current database status, server load and any of a variety of other variable characteristics including past performance reflected in the script from previous failures. Details of Transaction Timeout Calculator 15 are shown in FIG. 3.

With further reference to the FIG. 2 embodiment, there is shown several components of that operate under the EJB specification. For example, Java Message Service (JMS) 21 functions according to the specification to allow Java Applications to use enterprise messaging systems. Java Naming and Directory Interface (JNDI) 23 is a Java API for a directory service that allows clients to discover and look up data and objects via a name. Java Database Connectivity (JDBC) Persistence Manager 25 is an API that provides applications with a connection a database. Typically a JDBC resource is created for each database accessed by applications and is given a JNDI name. Transaction Manager 27 is an interface that defines the methods that allow an application server, such as Application Server 7, to manage transaction boundaries. J2EE Connection Manager 29 acts to create connections to enterprise information systems, such as, databases of various forms. Lastly, Process, Thread Management, Runtime Control 31 acts to provide conventional process routines with run time control. The EJB specification details how Application Server 7 handles the various processes provided by the above components.

Figure 3:
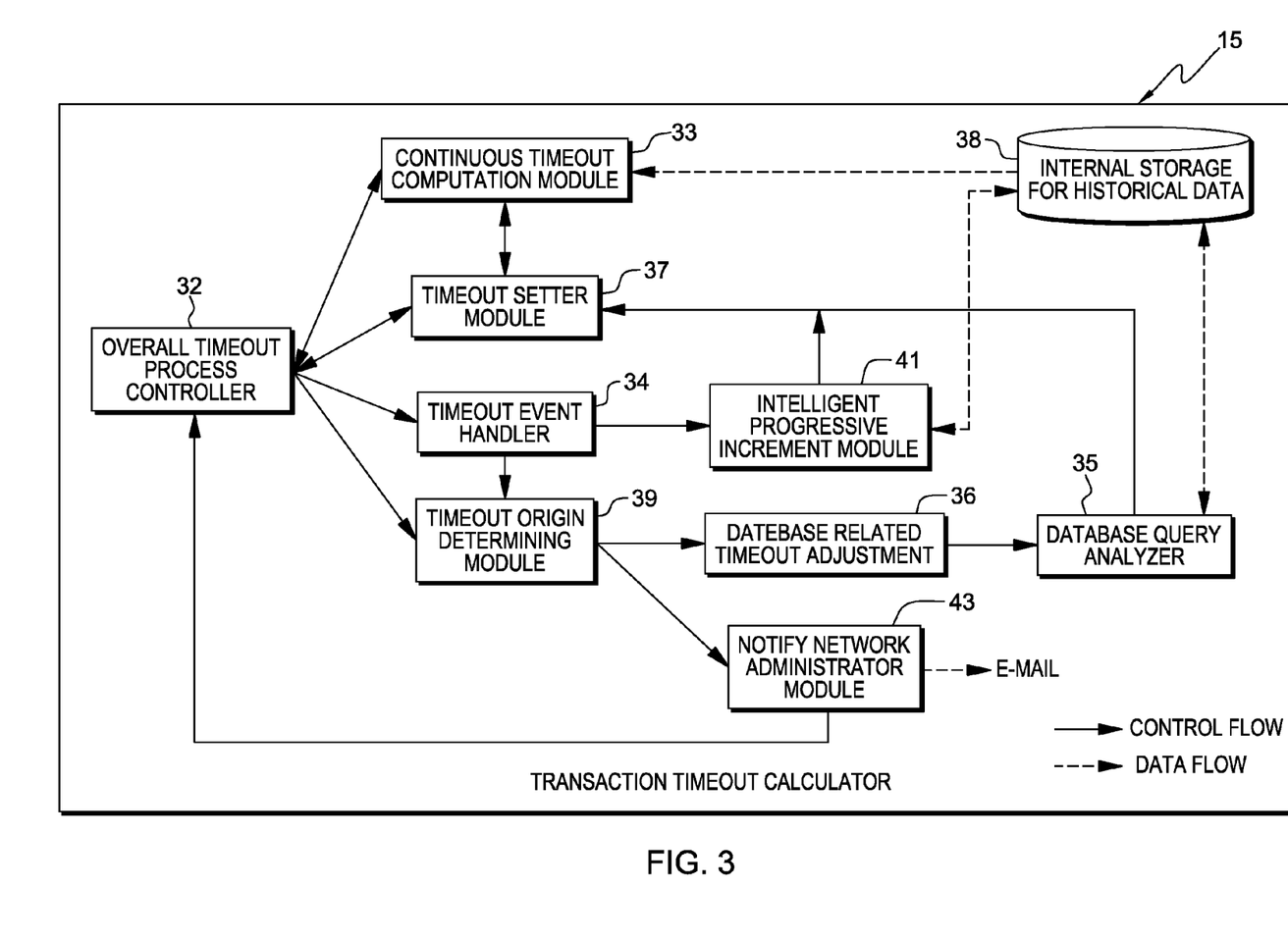
FIG. 3 shows the components of the transaction timeout calculator.

Further details of an embodiment of Transaction Timeout Calculator 15 are shown in FIG. 3. The Overall Timeout Controller module 32 controls the overall processing of the Transaction Timeout Calculator 15. As shown in flowchart of FIG. 4, this Overall Timeout Process Controller 32 computes the initial timeout of step 45 and sets timeout of step 47 by invoking the Timeout Setter Module 37 shown in the Transaction Timeout Calculator 15 of FIG. 3. It then passes control to the Continuous Timeout Computation Module 33, shown in FIG. 3. Whenever there is a timeout event, a set of steps is carried out by Timeout Event Handler module 34 according to the nature of timeout after which control returns to the Overall Timeout Process controller 32, and thus back to Continuous Timeout Computation Module 33. Continuous Timeout Computation Module 33 acts to continuously and dynamically create an automated script that is responsible for automatically setting the value for the transaction timeout depending upon the current conditions being monitored. Thus, the script is responsible for dynamically determining the maximum timeout that is required for a response to come back to EJB component 27 (FIG. 2) based upon, for example, record size, network speed, current data base being accessed, server load, as well as other characteristics that may affect the timeout duration required. This timeout determination also depends upon the learning of the automated script from previous such failures where there may have been a timeout due to the fact that the timeout was not optimal. Continuous Timeout Computation Module 33 runs in a loop, continuously recomputing the values of step 49 in FIG. 4 based on current system characteristics and historical data. Historical data supports, among other functions, adjusting timeout values when a particular time is approaching a current timeout value and thereby prevent a timeout event from occurring. If it is determined that timeout needs readjustment at step 51 in FIG. 4, it sets timeout step 47 in FIG. 4 by invoking the Timeout Setter Module 37 in FIG. 3.

Continuous Timeout Computation Module 33 in FIG. 3 may be interrupted by a timeout event. If the timeout event occurs at step 53 in FIG. 4, Continuous Timeout Computation Module 33 acts to leave the continuous loop and passes back control to the Overall Timeout Process Controller 32 in FIG. 3, which in turn passes control to the Timeout event Handler 34 in FIG. 4.

Figure 4:
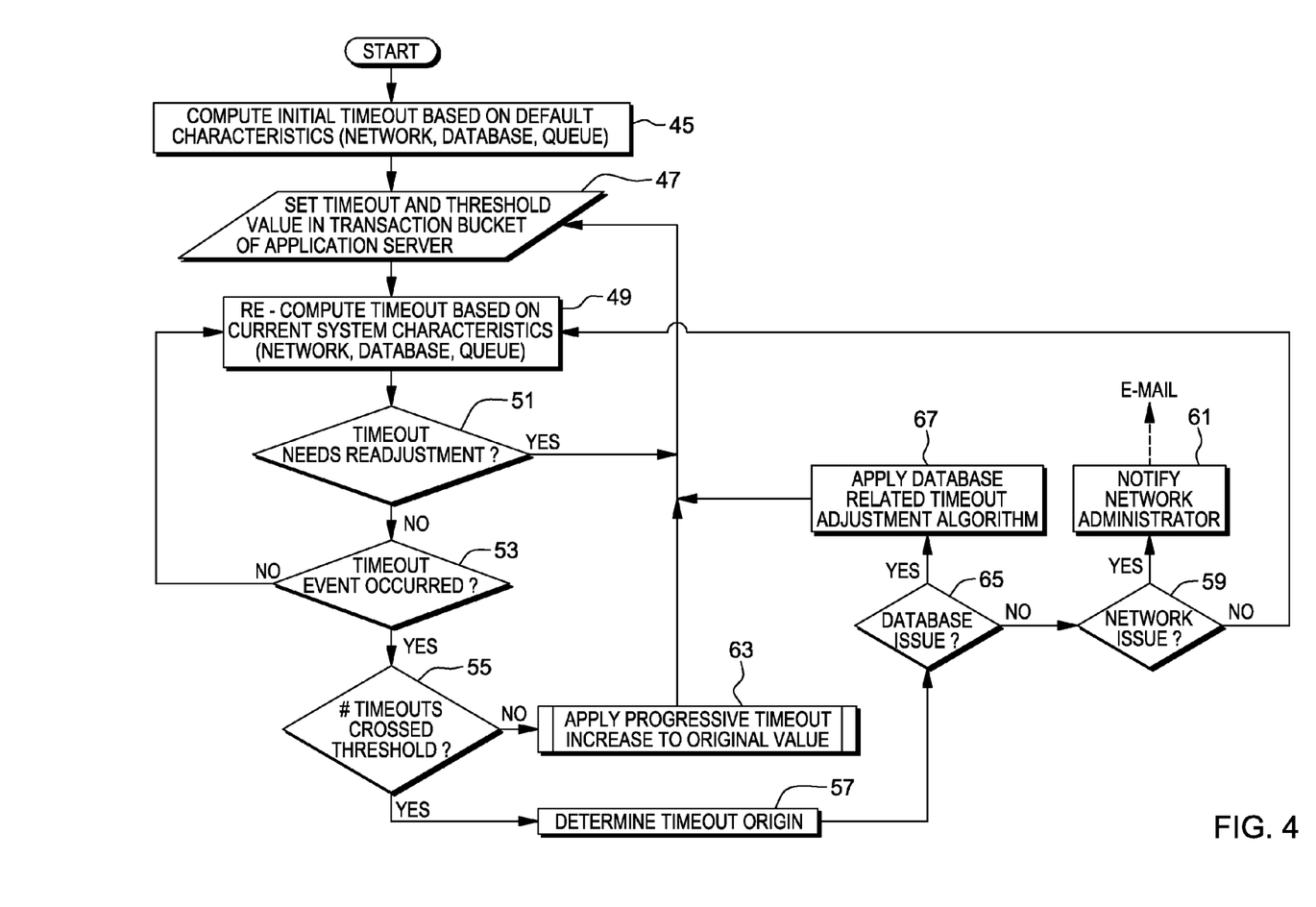
FIG. 4 shows a flow diagram of one embodiment for automatically adjusting timeout.

Timeout Event Handler 34 in FIG. 3 determines if this is a multiple timeout event and if so, whether the number of successive timeouts has exceeded a particular threshold as shown in step 55 in FIG. 4. If the threshold has not been crossed, Timeout Event Handler 34 passes control to the Intelligent Progressive Increment Module 41 shown in FIG. 3. If the threshold has been crossed, it passes control to the Timeout Origin Determining Module 39.

Intelligent Progressive Increment Module 41 in FIG. 3 first determines if the timeout event is a multiple timeout event or a single timeout event. For a single timeout, it applies a fixed increase to the timeout by invoking Timeout Setter Module 37. For a multiple timeout event, it acts to determine a pattern (combination of the queries running, network utilization, CPU load, log file size, application running, number of open database connections and other factors) which caused the multiple timeout to occur. It stores this knowledge in a database so that when a similar pattern appears in future, the timeout can be readjusted by the Continuous Timeout Computation Module. It then calculates an appropriate timeout increase based on the severity of the situation (e.g. CPU load is alarmingly high). Once the timeout increase has been calculated it invokes the Timeout Setter Module 37. Timeout Setter Module sets the timeout and passes back control to the Overall Timeout Process Controller which in turn hands back control to the Continuous Timeout Computation Module 33.

Timeout Origin Determining Module 39 in FIG. 3 acts to determine the hardware component which is the root cause for the timeouts to occur. Timeouts may occur because of a delay in a database transaction or because of a delay in the network component. If it is a database issue, as shown at step 65 in FIG. 4, Timeout Origin Determining Module 39 passes control to the Database Related Timeout Adjustment Module of FIG. 3 (Step 67 in FIG. 4). If it is a network issue, it passes control to Notify Network Administrator Module 43 in FIG. 3. This is shown at step 59 in FIG. 4 where a "yes" response passes control to the Notify Network Administrator step 61. Control may be given to the Network Issue step 59 after negative conclusion from the steps of Database Issue 65.

With further reference to FIG. 3, Database Related Timeout Adjustment component 36 collects all the queries that were executed in the current transaction. When the system load is relatively low, it passes control to the Database Query Analyzer component 35.

Database Query Analyzer component 35 analyzes each of the queries to determine conditions related to which database and tables are involved, the number of rows returned, how many concurrent queries were executed on the same tables, the database log size, the database locks that came into effect because of the queries and similar such data. It analyzes historical data patterns that correlate with timeout events to determine if similar conditions had resulted in timeouts in the past. It stores this information in Internal Storage For Historical Data 38. It also determines an appropriate timeout value based upon analysis of the historical data and invokes Timeout Setter Module 37 which sets the timeout and passes back control to the Overall Timeout Process Controller 32, which in turn hands back control to Continuous Timeout Computation Module 33.

Notify Network Administrator Module 43 in FIG. 3 is invoked when the network is the cause of the timeout. Since network analysis is not automatically performed during the Transaction Timeout process, Module 43 uses a particular set up procedure for the responsible Network Administrator and sends the administrator notification by using some form of communication, such as, electronic mail or short messaging service.

The above operation is carried out by Continuous Timeout Computation Module 33 by monitoring the results of Database Query Analyzer 35 and Intelligent Progressive Increment Module 41. Database Query Analyzer 35 acts to analyze the database and network characteristics, for example, and instruct Timeout Setter Module 37 to set the initial value for timeout based upon the analysis. This initial transaction timeout value may be set as the default value based upon, for example, the current network speed, database schema complexity and the maximum number of records that can come from the database for the most frequently executed queries and will be the initial maximum time required to execute a query. After the initial transaction timeout value is set, Database Query Analyzer 35 continues to analyze the database and network characteristics for use by Timeout Setter Module 37 and Continuous Timeout Computation Module 33. Continuous Timeout Computation Module 33 also acts via Time Setter Module 37, on the determinations made by Intelligent Progressive Increment Module 41 to increase or decrease the currently assigned timeout value when the analysis by Database Query Analyzer 35 indicates that changes in database and network characteristics warrant such increase or decrease.

As further shown in FIG. 3, Continuous Timeout Computation Module 33 also continuously monitors Timeout Event Handler 34 to determine when there is a transaction timeout. Whenever there is a transaction timeout, the timeout period is increased in arithmetic progression, for example, from the currently allocated value until there is no further transaction timeouts. This latter function is carried out by Intelligent Progressive Increment Module 41 which returns the new timeout value to Time Setter Module 37 and Continuous Timeout Computation Module 33.

As previously pointed out, timeout Origin Determining Module 39 determines the hardware or software component from which the timeout originated. It may determine whether it is a database issue or a network issue. It acts with Database Query Analyzer 35 to determine and record the database characteristics of the database queries and timeout events and uses the information to determine timeout values.

Notify Network Administrator Module 43 notifies the appropriate Network Administrator when multiple timeout events have occurred and the Timeout Origin Determining Module 39 has determined that it is a network issue requiring Network Administrator attention.

An automated script of timeouts from the script language may act to dynamically modify the value of transaction timeouts in the Application Server without intervention from an Administrator, for example, thereby making the Application Server more effective, responsive and efficient. In this regard, transaction timeout errors are detected and differentiated from other errors using specific EJB error messages for transaction timeout that may vary from vendor to vendor with respect to application servers.

By the above process, whenever the first EJB timeout occurs, the script may automatically append a time increment to the existing transaction time value. For each subsequent transaction timeout after the initial timeout, this appending step may occur. The script may also poll the frequency of the errors to gauge when the next timeout may occur.

Where there are multiple timeouts, the script may send a request similar to the ones that created the timeouts to determine if the problem is due to a network issue or a database issue. This function may be carried out independently when there are fewer loads on the system. Where errors occur because of the database record size returned is too large, the script may independently run a query to determine the maximum time that would be required to return the records and use this time to automatically adjust the transaction timeout to that value whenever such record request is executed.

FIG. 4 shows one embodiment for automatically and dynamically adjusting timeout values for transactions run for each application. Thus, each application employs this dynamically adjusting process using its own default characteristics to arrive at its own timeout values. The process begins with step 45 wherein a routine is initiated to Compute Initial Timeout Based On Default Characteristics, such as, network, database and queue characteristics. The initial timeout value is then set by step 47 wherein an instruction is carried out to Set Timeout and Threshold Value In Transaction Bucket of Application Server. The timeout is then dynamically recomputed during the transaction via step 49 to Re-Compute Timeout Based On Current System Characteristics, such as, network, database and query characteristics. Where it is determined that the re-computed timeout is sufficiently different from the existing timeout, as determined by a "yes" response at step 51 asking if Timeout Need Readjustment, then the process readjusts the timeout value and returns to step 47 to Set Timeout and Threshold Value in Transaction Bucket of Application Server.

Where it is determined at step 51 that the timeout does not need readjustment, the process moves forward to determine if a Timeout Event Occurred, as shown at step 53. If the response is "no", the process returns to step 49 to Re-Compute Timeout Based On Current System Characteristics. Where a timeout at step 53 is determined to have occurred, ("yes" response) a decision is then made as to whether the number of timeouts has crossed some predetermined threshold number. This is carried out in step 55 (# Timeouts Crossed Threshold?). If the number of timeouts has crossed the threshold number, the process moves to step 57 to Determine Timeout Origin by determining if a Network Issue is involved, as shown at step 59. If a network issue is involved, the Administrator is notified by the Notify Network Administrator at step of block 61. If no network issue is involved, the process again returns to the step of block 49 to Re-Compute Timeout Based On Current System Characteristics.

Where the step in block 55 determines that the number of timeouts has not crossed a predetermined threshold, then a step is carried to add an increment of time to the current timeout value via the step of block of step 63 (Apply Progressive Timeout Increase To Original Value). This is carried out by having the step of block 47 act to Set Timeout Threshold Value In Transaction Bucket of Application Server to the new value by adding the increment of time. If the number of timeouts has crossed the predetermined threshold, the step of block 55 goes to the step of block 57 to determine if the timeout involves a Database Issue or a Network Issue.

If the determination in block 57 is "yes", i.e. it is a database issue, an additional step acts to Apply Database Related Timeout Adjustment Algorithm at the step of block 67. The database related timeout value determined by the Timeout Adjustment Algorithm is then sent to Set Timeout and Threshold value in Transaction Bucket of Application Server in block 47. Where it is determined at the step of block 57 that there is no Database Issue, the process again moves to determine if, as shown at the step of block 59, there is a Network Issue. If it is determined that there is a Network Issue, the process moves to block 61 where it notifies, by way of electronic mail or otherwise, the Network Administrator of this situation.

Figure 5:
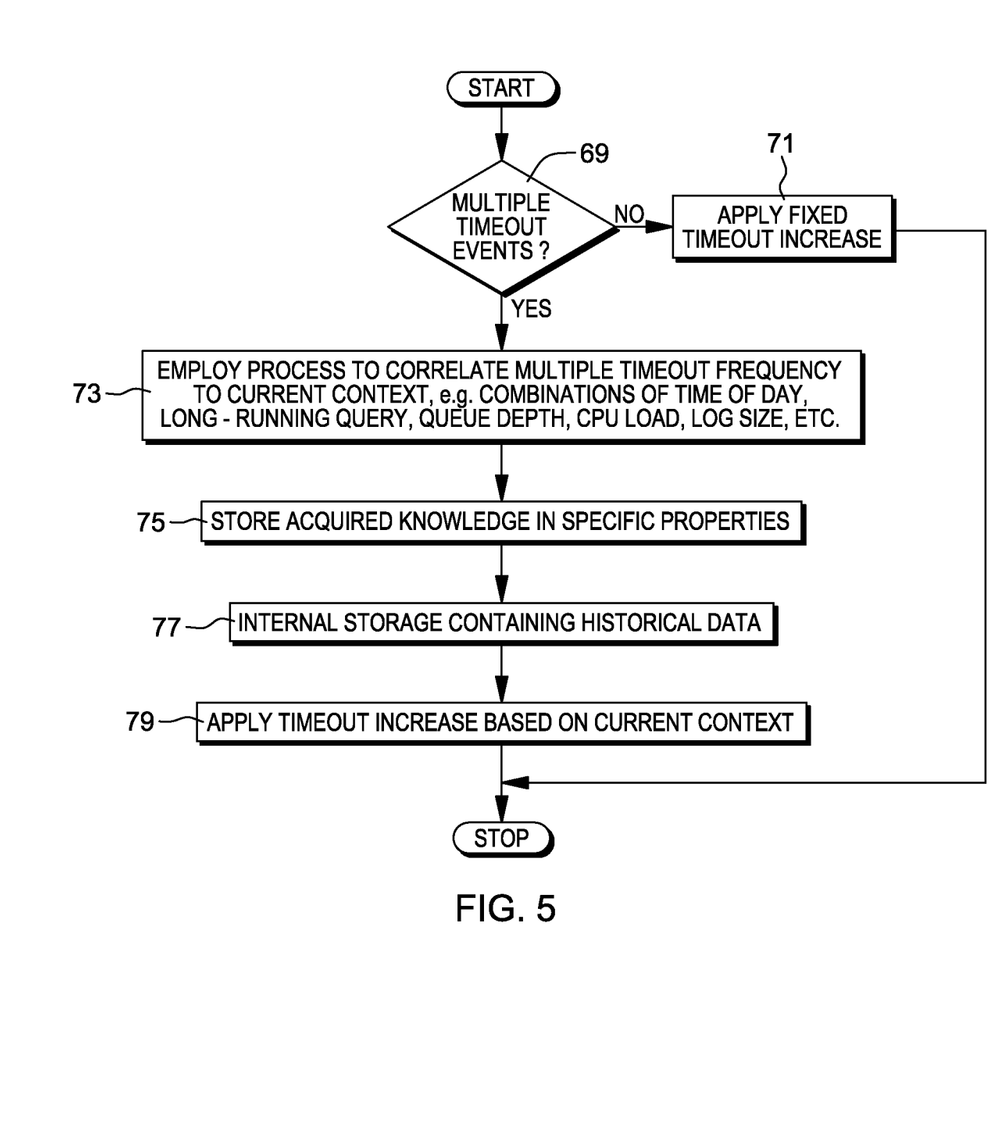
FIG. 5 shows a flow diagram of one embodiment for carrying out progressive increase of timeout.

FIG. 5 shows one embodiment of an algorithm, for example, for carrying out progressive increases in timeouts values. The process begins at the step of block 69 to determine if there are Multiple Timeout Events. If "no" multiple events have occurred, the process moves to step 71 to Apply Fixed Timeout Increase. If "yes", there are multiple events, the process moves to the step of block 73 to Employ Process To Correlate Multiple Timeout Frequency To Current Context as, for example, using combinations of time of day, day of week, long running query, query depth, CPU load, log size, number of concurrent users, etc.

After employing the process of block 73, the results acquired by the correlation process of block 73 are stored by the step of block 75 and this knowledge, along with the historical data stored in block 77, is used to apply a timeout increase in block 79 based upon the current context rather than applying a fixed timeout increase, as done in the step of block 71.

Figure 6:
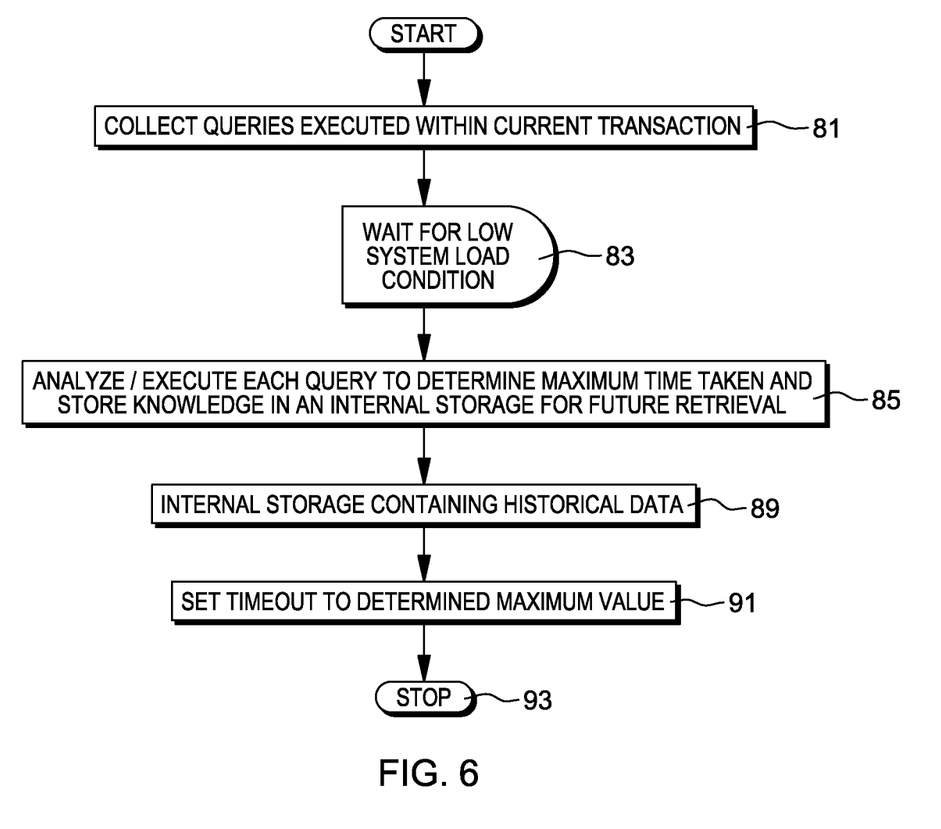
FIG. 6 shows one embodiment of a flow diagram of database related timeout adjustment.

FIG. 6 shows a flow diagram of one embodiment of a database related timeout adjustment process, as shown in block 67 of FIG. 4. The process starts with the step shown in block 81 to Collect Queries Executed Within Current Transaction and then proceeds to the step of block 83 to Wait For Low System Load Condition. When a low system load condition occurs, a step, as shown in block 85, is carried out to Analyze/Execute Each Query To Determine Maximum Time Taken And Store Knowledge in An Internal Storage For Future Retrieval. The stored knowledge is then taken with the Internal Storage Containing Historical Data shown by block 89, and used to determine maximum timeout value, as shown by the step shown in block 91. The step of block 91 acts to Set Timeout To Determined Maximum Value and the process ends at block 93.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for automatically tuning transaction timeout values in an application server, the method comprising:
   determining an initial transaction timeout value for return of an enterprise application request based upon known load and status of database and network connection conditions used to respond to the enterprise application request;
   determining a new transaction timeout value for said transaction timeout value of said transaction request based upon network characteristics, database characteristics and queue characteristics;
   determining that a first instance of a number of timeouts has exceeded a predetermined threshold;
   responsive to the determination of the first instance, determining that the timeouts are due to a database issue: and
   responsive to the determination that the timeouts giving rise to the first instance are due to a database issue, applying a database related timeout adjustment algorithm.

2. The method claim 1 wherein the application of the database related timeout adjustment program includes:
   collecting a plurality of queries executed within a current transaction;
   for each query of the plurality of queries, analyzing and executing the query to determine a maximum time taken value; and
   setting the database related timeout to the maximum time taken value.

3. The method of claim 2 further comprising:
   determining that a second instance of a number of timeouts has exceeded a predetermined threshold;
   responsive to the determination of the second instance, determining that the timeouts are due to a network issue: and
   responsive to the determination that the timeouts are due to a network issue, notifying a network administrator.

4. The method of claim 1 further comprising:
   determining that a second instance of a number of timeouts has exceeded a predetermined threshold;
   responsive to the determination of the second instance, determining that the timeouts giving rise to the second instance are due to a network issue; and
   responsive to the determination that the timeouts are due to a network issue, notifying a network administrator.

5. A computer program product for automatically tuning transaction timeout values in an application server, the computer program product comprising:
   a machine readable storage device; and
   computer code stored on the machine readable storage device, with the computer code including instructions for causing a processor set to perform operations including the following:
   determining an initial transaction timeout value for return of an enterprise application request based upon known load and status of database and network connection conditions used to respond to the enterprise application request,
   determining a new transaction timeout value for said transaction timeout value of said transaction request based upon network characteristics, database characteristics and queue characteristics,
   determining that a first instance of a number of timeouts has exceeded a predetermined threshold,
   responsive to the determination of the first instance, determining that the timeouts are due to a database issue, and
   responsive to the determination that the timeouts giving rise to the first instance are due to a database issue, applying a database related timeout adjustment algorithm.

6. The computer program product of claim 5 wherein the application of the database related timeout adjustment program includes:
   collecting a plurality of queries executed within a current transaction;
   for each query of the plurality of queries, analyzing and executing the query to determine a maximum time taken value; and
   setting the database related timeout to the maximum time taken value.

7. The computer program product of claim 6 wherein the computer code further includes instructions for causing the processor set to perform the following operations:
   determining that a second instance of a number of timeouts has exceeded a predetermined threshold;
   responsive to the determination of the second instance, determining that the timeouts are due to a network issue; and
   responsive to the determination that the timeouts are due to a network issue, notifying a network administrator.

8. The computer program product of claim 5 wherein the computer code further includes instructions for causing the processor set to perform the following operations:
   determining that a second instance of a number of timeouts has exceeded a predetermined threshold;
   responsive to the determination of the second instance, determining that the timeouts giving rise to the second instance are due to a network issue; and
   responsive to the determination that the timeouts are due to a network issue, notifying a network administrator.

9. A computer system for automatically tuning transaction timeout values in an application server, the computer system comprising:
- a processor set; a machine readable storage device; and computer code stored on the machine readable storage device, with the computer code including instructions for causing the processor set to perform operations including the following:
- determining an initial transaction timeout value for return of an enterprise application request based upon known load and status of database and network connection conditions used to respond to the enterprise application request,
- determining a new transaction timeout value for said transaction timeout value of said transaction request based upon network characteristics, database characteristics and queue characteristics,
- determining that a first instance of a number of timeouts has exceeded a predetermined threshold, responsive to the determination of the first instance, determining that the timeouts are due to a database issue, and
- responsive to the determination that the timeouts giving rise to the first instance are due to a database issue, applying a database related timeout adjustment algorithm.

10. The computer system of claim 9 wherein the application of the database related timeout adjustment program includes:
- collecting a plurality of queries executed within a current transaction;
- for each query of the plurality of queries, analyzing and executing the query to determine a maximum time taken value; and
- setting the database related timeout to the maximum time taken value.

11. The computer system of claim 10 the computer code further includes instructions for causing the processor set to perform the following operations:
- determining that a second instance of a number of timeouts has exceeded a predetermined threshold;
- responsive to the determination of the second instance, determining that the timeouts are due to a network issue; and
- responsive to the determination that the timeouts are due to a network issue, notifying a network administrator.

12. The computer system of claim 9 the computer code further includes instructions for causing the processor set to perform the following operations:
- determining that a second instance of a number of timeouts has exceeded a predetermined threshold;
- responsive to the determination of the second instance, determining that the timeouts giving rise to the second instance are due to a network issue; and
- responsive to the determination that the timeouts are due to a network issue, notifying a network administrator.

* * * * *